United States Patent
Nakanishi et al.

[11] Patent Number: 5,413,010
[45] Date of Patent: May 9, 1995

[54] ELECTRIC MOTOR HAVING A SPHERICAL ROTOR AND ITS APPLICATION APPARATUS

[75] Inventors: Teruo Nakanishi; Yohei Ando; Kiyokatsu Sakakibara, all of Komaki, Japan

[73] Assignee: Mitsubishi Jukogyo Kabushiki Kaisha, Tokyo, Japan

[21] Appl. No.: 922,836

[22] Filed: Jul. 31, 1992

[30] Foreign Application Priority Data

| Jul. 31, 1991 | [JP] | Japan | 3-060422 U |
| Aug. 29, 1991 | [JP] | Japan | 3-218567 |
| Aug. 30, 1991 | [JP] | Japan | 3-220001 |
| Nov. 13, 1991 | [JP] | Japan | 3-297251 |

[51] Int. Cl.$^6$ ............ G01C 19/30; H02K 21/12; B64C 17/02
[52] U.S. Cl. ............ 74/5.22; 74/5.46; 74/5.7; 310/156; 318/648
[58] Field of Search ........ 74/5.22, 5.7, 5.46; 310/266, 156, 90.5; 318/648, 649, 689

[56] References Cited

U.S. PATENT DOCUMENTS

| 1,589,039 | 6/1926 | Anschutz-Kaempfe | 74/5.46 X |
| 2,779,885 | 1/1957 | Reynst et al. | 310/266 X |
| 3,077,672 | 2/1963 | Sasaki et al. | 74/5.7 X |
| 3,216,263 | 11/1965 | Culver et al. | 74/5.46 |
| 3,412,618 | 11/1968 | Staats | 74/5.7 |
| 4,008,623 | 2/1977 | Ehrich et al. | 74/5.46 X |
| 4,441,375 | 4/1984 | Minohara et al. | 74/5.46 |
| 4,464,943 | 8/1984 | Andrews et al. | 74/5.7 X |
| 4,611,863 | 9/1986 | Isely | 74/5.46 X |
| 4,661,737 | 4/1987 | Barri | 310/166 |
| 4,739,241 | 4/1988 | Vachtsevanos et al. | 310/166 X |
| 4,757,220 | 7/1988 | Pouillange | 310/266 X |
| 4,908,558 | 3/1990 | Lordo et al. | |
| 5,070,289 | 12/1991 | Pona | 318/138 X |

FOREIGN PATENT DOCUMENTS

| 0113267 | 7/1984 | European Pat. Off. | |
| 1807477 | 9/1977 | Germany | 74/5.7 |
| 0120909 | 9/1981 | Japan | 74/5.46 |
| 802776 | 10/1958 | United Kingdom | 74/5.7 |

OTHER PUBLICATIONS

Patent Abstracts of Japan, vol. 12, No. 085 (E-591) Mar. 17, 1988.
Patent Abstracts of Japan, vol. 11, No. 036 (E-477) Feb. 3, 1987.
Patent Abstracts of Japan, vol. 10, No. 50 (E-384)(2107) Feb. 27, 1986.

*Primary Examiner*—Rodney H. Bonck
*Attorney, Agent, or Firm*—Wenderoth, Lind & Ponack

[57] ABSTRACT

A multi-freedom electric motor has a broad operational range and a wide space for accommodating an article. The electric motor includes a spherical rotor, a plurality of magnets disposed on an outer surface of the rotor with polarities of the respective adjacent magnetic poles being different from one another, a stator provided along the outer surface of the rotor, and a plurality of magnets opposed to the magnets disposed on an inner surface of the stator. The rotor is supported by a spherical bearing provided on the stator. Either the magnets on the rotor or the magnets on the stator are electromagnets. Electric current are supplied to the electromagnets as controlled by a controller. The multi-freedom electric motor can be employed in a space stabilizer for maintaining the spherical attitude of an article, a control moment gyro for performing an attitude control in space, and an agitating apparatus.

11 Claims, 12 Drawing Sheets

ELECTRIC MOTOR HAVING A SPHERICAL ROTOR AND ITS APPLICATION APPARATUS

BACKGROUND OF THE INVENTION

The present invention relates to an electric motor having a spherical rotor, which is available for driving an optical sensor, a control moment gyro, an inductive detector device or an electromagnetic wave transmitter of an aircraft, a flying object or the like, or a visual sensor of a robot.

As an electric motor having a spherical rotor in the prior art, a "spherical surface motor" which is representative of multi-freedom electric motors is disclosed in Laid-Open Japanese Patent Specification No. 62-221856 (1987). This motor comprises, as shown in FIG. 16(a), a hemispherical rotor 103 consisting of permanent magnets 101 or of permanent magnets 101 and yokes 102, a stator 105 having a plurality of windings 104 arrayed on a hemispherical surface, and a spherical bearing 107 for rotatably supporting an output shaft 106 extending from the stator 105. As shown in FIG. 16(b), a driving torque in any given direction is generated by controlling a current flowing through the respective windings 104 of the stator 105 in a magnetic field produced by the permanent magnets 101 whose N-poles and S-poles are arranged along the surface of the hemispherical rotor 103.

In the "spherical surface motor" which is representative of multi-freedom electric motors in the prior art, the angle over which a rotor shaft can be swung is small due to structural limitations, the number of movable parts is many, its operating mechanism is complex, and the space within the rotor is small.

SUMMARY OF THE INVENTION

It is therefore one object of the present invention to provide a multi-freedom electric motor, which can be compact, which has a broad operation range and moreover a broad space for accommodating articles within a rotor, and also to provide various instruments having their enhanced capabilities and simple structures owing to their use of this multi-freedom electric motor.

To achieve this object, the present invention provides an electric motor having a spherical rotor, a plurality of magnets disposed contiguously on an outer surface of the rotor with the polarities of the respective adjacent magnetic poles differing from one another, a stator provided along the outer surface of the rotor and having a plurality of magnets disposed on its inner surface as opposed to the magnets on the rotor, a spherical bearing coupled to the stator for rotatably supporting the outer surface of the rotor, either the magnets of the rotor or the magnets of the stator being electromagnets, and a controller connected to the respective electromagnets for controlling electric currents flowing through the respective electromagnets to rotate the rotor relative to the bearing.

The spherical rotor has a spherical shell to define an interior space for accommodating an article therewith.

The electric motor having a spherical rotor according to the present invention operates in the following manner. When an operating direction command signal for the rotor has been input to the controller, the controller calculates electromagnetic forces to be generated by the respective electromagnets in the stator or the rotor, thus determined magnitudes of the currents to be made to flow through the respective electromagnets, and feeds the currents to the electromagnets. The electromagnetic forces generated by the electromagnets as a result of these currents act upon the permanent magnets provided on the surface of the rotor or the stator.

Since the rotor is rotatably supported by the spherical bearing, it is driven when the electromagnetic forces act upon the permanent magnets. That is, the rotor rotates in predetermined directions based on the operating direction command signal.

According to one application of the present invention, a space stabilizing apparatus has a gyro accommodated within the rotor. On the basis of an output signal of the gyro, the same rotor is rotated to a predetermined position so that the gyro may be always oriented in a predetermined direction.

Furthermore, according to another application of the present invention, a control moment gyro comprises a flywheel consisting of the spherical rotor having a plurality of magnets with magnetic poles of different polarities disposed in a lattice-shaped array on its outer surface, and a gimbal consisting of the spherical stator disposed on the outside of this spherical rotor via a hydrostatic bearing and having a plurality of electromagnets disposed on its inner surface.

Also, according to still another application of the present invention, there is provided an agitator in which agitating blades are provided on the inner surface of the hollow spherical rotor, and this spherical rotor is rotated by controlling the electromagnets of the stator.

The above-mentioned and other objects, features and advantages of the present invention will become more apparent by referring to the following description of preferred embodiments of the invention made in conjunction with the accompanying drawings.

DETAILED DESCRIPTION OF THE PREFERRED EMBODIMENTS

Preferred Embodiment 1

Figure 1:
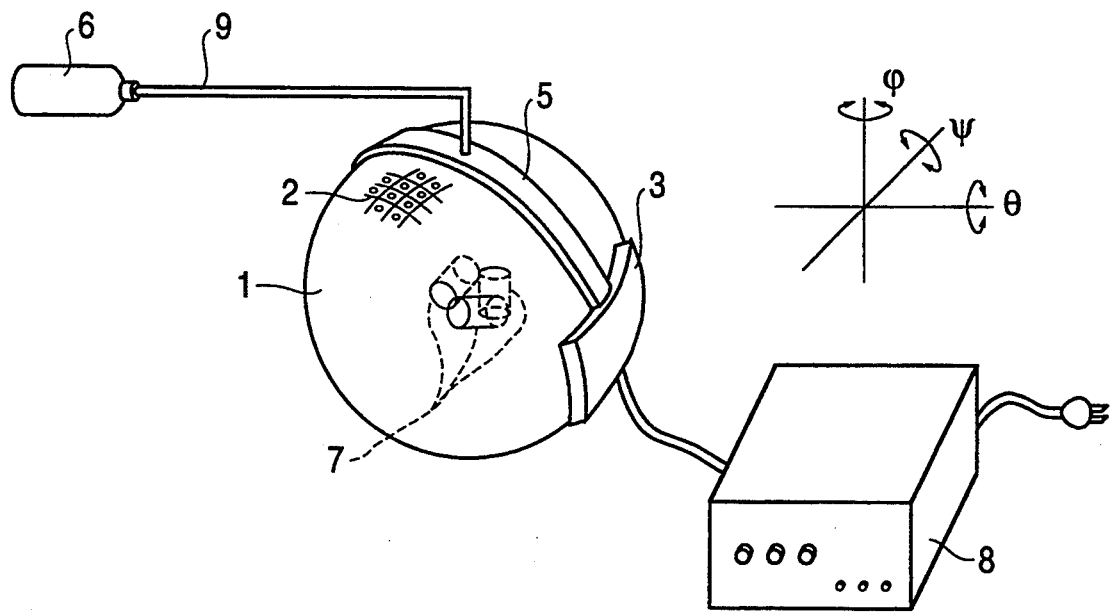
FIG. 1 is a schematic view of a first preferred embodiment of an electric motor having a spherical rotor according to the present invention.
Figure 2:
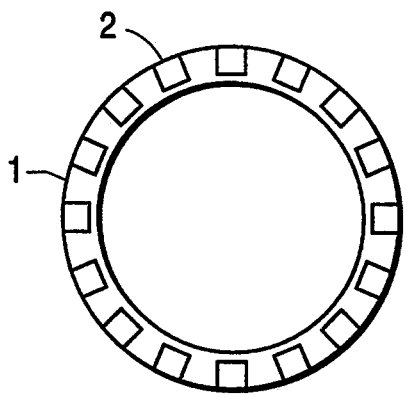
FIG. 2 is a cross-sectional view of the first preferred embodiment of the spherical rotor.
Figure 3:
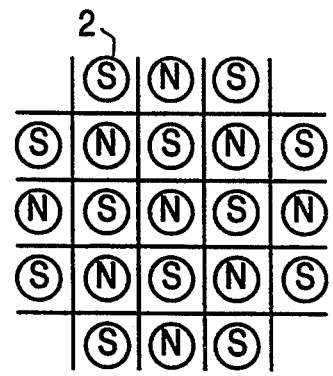
FIG. 3 is an illustration of the arrangement of permanent magnets on the outer surface of the spherical rotor.
Figure 4:
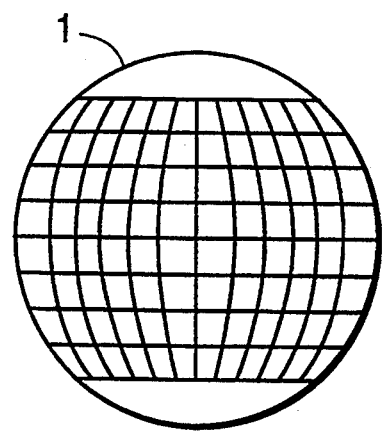
FIG. 4 is a schematic view of the range over which permanent magnets can be mounted on the outer surface of the spherical rotor.

A first preferred embodiment of an electric motor having a spherical rotor according to the present invention is illustrated in FIG. 1. In this figure, reference numeral 1 designates the spherical rotor, which has a hollow spherical shape as shown in FIG. 2. On the outer surface of the spherical rotor 1 are mounted a plurality of permanent magnets 2 in a lattice form with polarities of adjacent magnetic poles differing from one another as shown in FIG. 3. However, permanent magnets 2 are not provided at the polar portions of the spherical rotor 1, where it would be impossible to arrange adjacent magnetic poles having different polarities from one another, as shown in FIG. 4.

Figure 5:
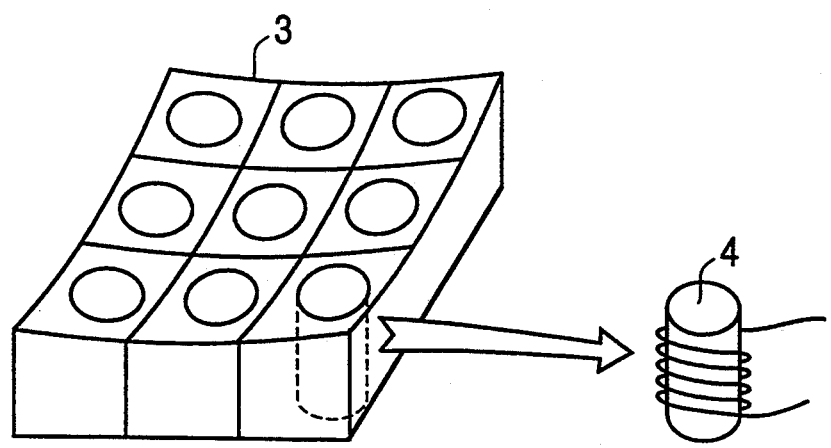
FIG. 5 is a schematic view of the stator of the first preferred embodiment.

Reference numeral 3 designates a stator provided outside of the spherical rotor 1. On the inside surface of the stator 3, opposed to the surface of the spherical rotor 1, are disposed electromagnets 4 in a lattice form and in a spherical array as shown in FIG. 5. The interval between the electromagnets 4 of the stator 3 is chosen to be $\frac{2}{3}$ of an average value of the intervals between the permanent magnets 2 of the spherical rotor 1.

Reference numeral 5 designates a hydrostatic bearing (spherical bearing) coupled to the stator 3 and extending once around the outer circumference of the spherical rotor 1. The bearing 5 is pressurized by gas supplied from a pressurized gas bomb 6 via a pressurizing pipe 9. This hydrostatic bearing 5 cooperates with the spherical surface of the spherical rotor 1 but the spherical rotor is held by the bearing 5 in a non-contact manner.

Reference numeral 7 designates an angular velocity detector for detecting three coordinate components of an angular velocity. The angular velocity signals are sent to a controller 8 as will be described later via wirings (not shown), and the controller 8 determines the position of the spherical rotor 1 by integrating the angular velocity signals. In addition, on the basis of these position signals, a relative position of the spherical rotor 1 with respect to the stator 3 is calculated.

The controller 8 is also connected to the respective electromagnets 4 of the stator 3 via wirings.

Figure 6:
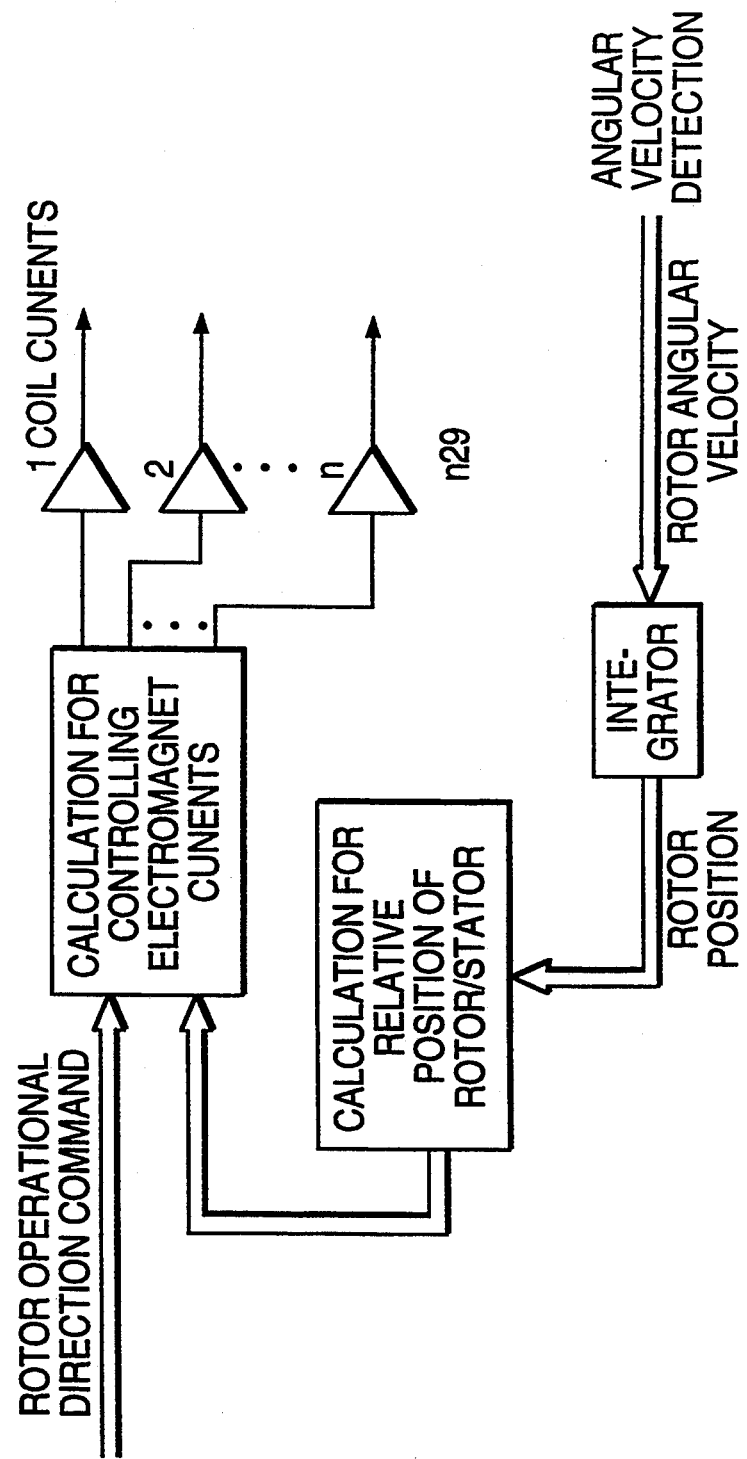
FIG. 6 is a functional block diagram of a controller of the first preferred embodiment.

The controller 8 operates as illustrated by the functional block diagram in FIG. 6, and controls the electromagnets 4 of the stator 3. More particularly, at first an operational direction command signal (or a force direction command signal) of the spherical rotor 1 and angular velocity signals of the spherical rotor 1 are input to the controller 8. The controller 8 integrates the latter input signals to convert them into position signals, and calculates a relative position of the spherical rotor 1 with respect to the stator 3 by making use of these position signals. Electromagnetic forces to be generated by the respective electromagnets 4 are calculated according to these relative position signals and the operational direction command signal (or the force direction command signal) on the basis of a logic sequence corresponding to a magnetic field condition. Thus values of currents to be fed to the respective electromagnets 4 are calculated, and the currents are supplied.

Since the coupling between the stator 3 and the spherical rotor 1 relies upon the hydrostatic bearing 5 which keeps the spherical rotor 1 in a floating condition by means of the pressure of the gas supplied from the pressurized gas bomb 6, the spherical rotor 1 is freely rotatable in any direction. Therefore, if electromagnetic forces are generated at the respective electromagnets 4 of the stator 3, they act upon the magnetism of the permanent magnets 2 of the spherical rotor 1 to cause the spherical rotor 1 to perform predetermined actions. It is to be noted that the interval between the electromagnets 4 of the stator 3 is chosen to be $\frac{2}{3}$ times an average value of the intervals between the permanent magnets 2 of the spherical rotor 1 so that driving forces will be generated at the spherical rotor 1. In addition, owing to the fact that permanent magnets 2 which do not necessitate wirings are provided on the rotor, an especially broad space can be reserved within the rotor. Also since movement of the rotor is not restricted by wirings, rotational movement over a very broad range becomes possible.

As described above, an apparatus in which an operational range of a rotor is broad, a broad accommodation space for accommodating articles is reserved within a rotor, and continuous multi-freedom operations in any arbitrary direction achieved with a simple mechanism, has been realized.

It is to be noted that although the permanent magnets 2 on the rotor are disposed in a lattice-shaped array, and consequently no permanent magnets 2 are provided at polar portions of the rotor in this preferred embodiment, it is also possible to array the permanent magnets 2 over the entire surface of the rotor, for instance, by arranging the permanent magnets 2 in a pattern of the panels of a soccer ball.

Preferred Embodiment 2

Figure 7:
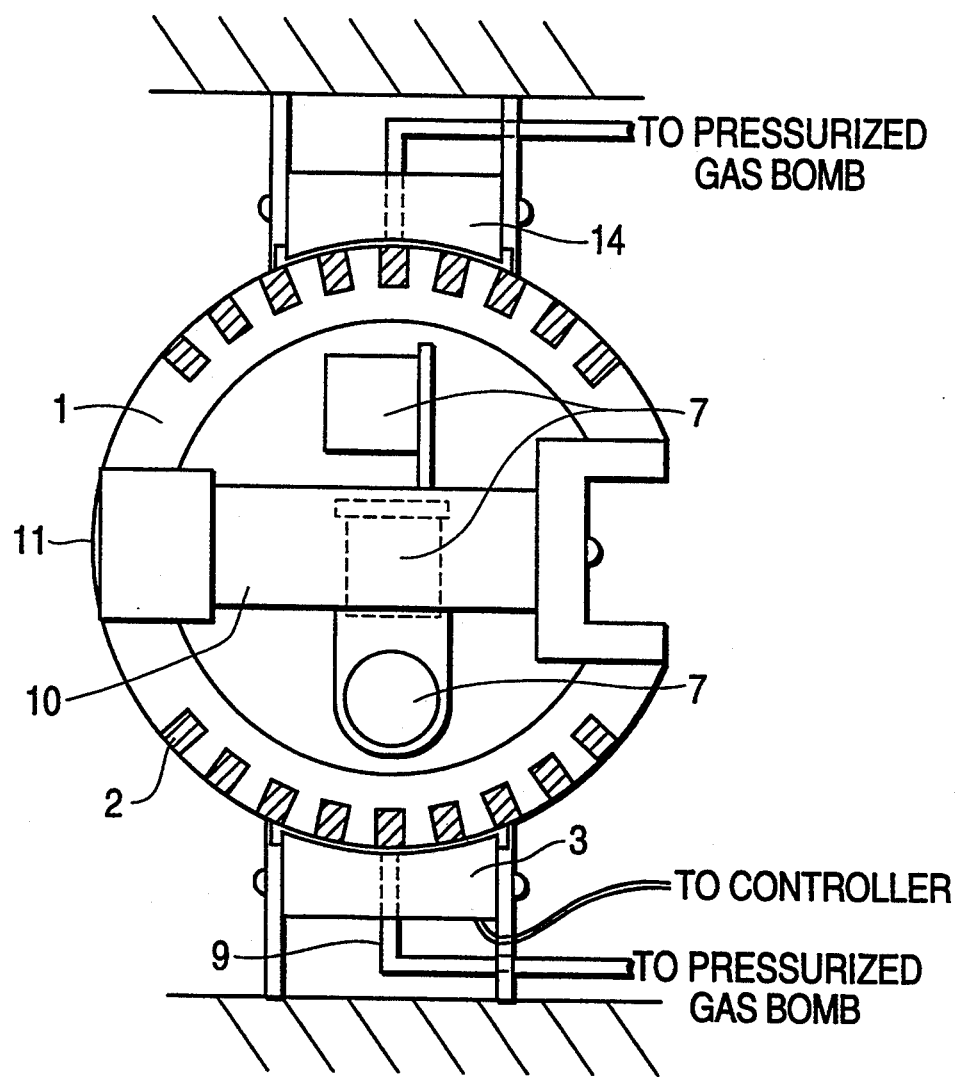
FIG. 7 is a cross-sectional view of an orientation control device of a camera, to which a second preferred embodiment of an electric motor having a spherical rotor according to the present invention is applied.

A second preferred embodiment of the present invention is illustrated in FIG. 7. In this preferred embodiment, a spherical bearing 14 is disposed symmetrically to a stator 3 with a spherical rotor 1 interposed therebetween. Also, a camera 10 (a picture camera, an infrared ray camera, etc.) is disposed within the spherical rotor 1 by making use of the space within the spherical rotor 1, and the electric motor is utilized as an orientation control apparatus for the camera 10.

In the above-described embodiment, the camera 10 is fixed inside of the spherical rotor 1, and the spherical rotor 1 supported by the stator 3 and the spherical bearing 14 is revolved by controlling the currents fed to the respective electromagnets 4 on the stator 3, whereby the camera 10 is oriented as desired to carry out photography through a lens 11. In this case, the rotor position signals used for phase detector between the spherical rotor 1 and the stator 3 can be also used to provide feedback for the purpose of position control. As exemplified by this preferred embodiment, by mounting the camera 10 within the spherical rotor 1, it becomes possible to widely and arbitrarily change a field of view of the camera 10 without employing a complicated gimbal mechanism. Also, this apparatus has an extremely simple and compact structure despite such excellent capabilities.

Preferred Embodiment 3

Figure 8:
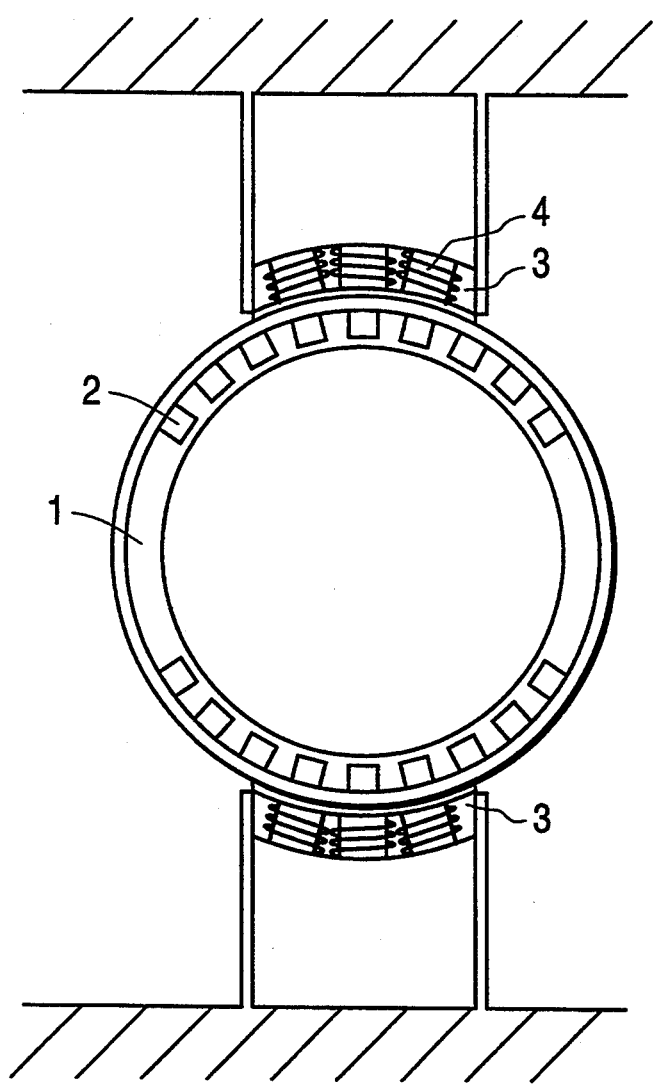
FIG. 8 is a cross-sectional view of a third preferred embodiment of an electric motor having a magnetic bearing according to the present invention.

A third preferred embodiment of the present invention is illustrated in FIG. 8. Instead of the hydrostatic bearing 5 of the first preferred embodiment, the embodiment of FIG. 8 uses a magnetic bearing formed by the electromagnets 4 of the stators 3.

In the above-described embodiment, the stators 3 are opposed symmetrically with respect to the center of the spherical rotor 1. Since the magnetic forces generated between the electromagnets 4 of the stators 3 and the permanent magnets 2 in the spherical rotor 1 have components directed towards the center of the spherical rotor 1 and components (torques) directed in the tangential direction of the spherical rotor 1, by controlling the forces with respect to the two opposed stators 3, it is possible to cause the stators 3 to function as a magnetic bearing.

In addition, because two stators 3 are provided, the torque is correspondingly doubled.

Preferred Embodiment 4

Figure 9:
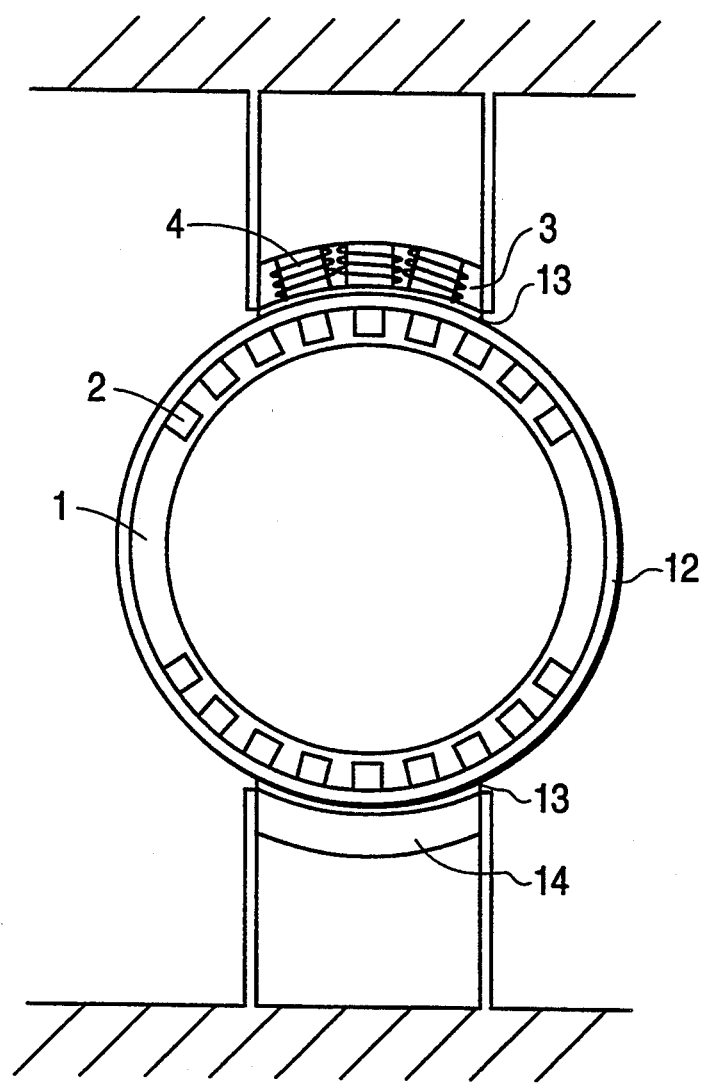
FIG. 9 is a cross-sectional view of a fourth preferred embodiment of an electric motor having a slide bearing according to the present invention.

A fourth preferred embodiment of the present invention is shown in FIG. 9. Instead of the hydrostatic bearing 5 of the first preferred embodiment, the embodiment of FIG. 9 employs a sliding bearing.

In the above-described embodiment, the respective surfaces of the spherical rotor 1 and the stator 3 one coated with thin films 12 and 13 of resin. Also, at a position symmetrical to the stator 3 with respect to the center of the spherical rotor 1 is disposed a spherical bearing 14, and like the stator 3 this spherical bearing 14 is coated. In this preferred embodiment, certain frictional forces can be established by maintaining a constant surface pressure as a result of positional adjustment of the stator 3 and the spherical bearing 14.

Preferred Embodiment 5

Figure 10:
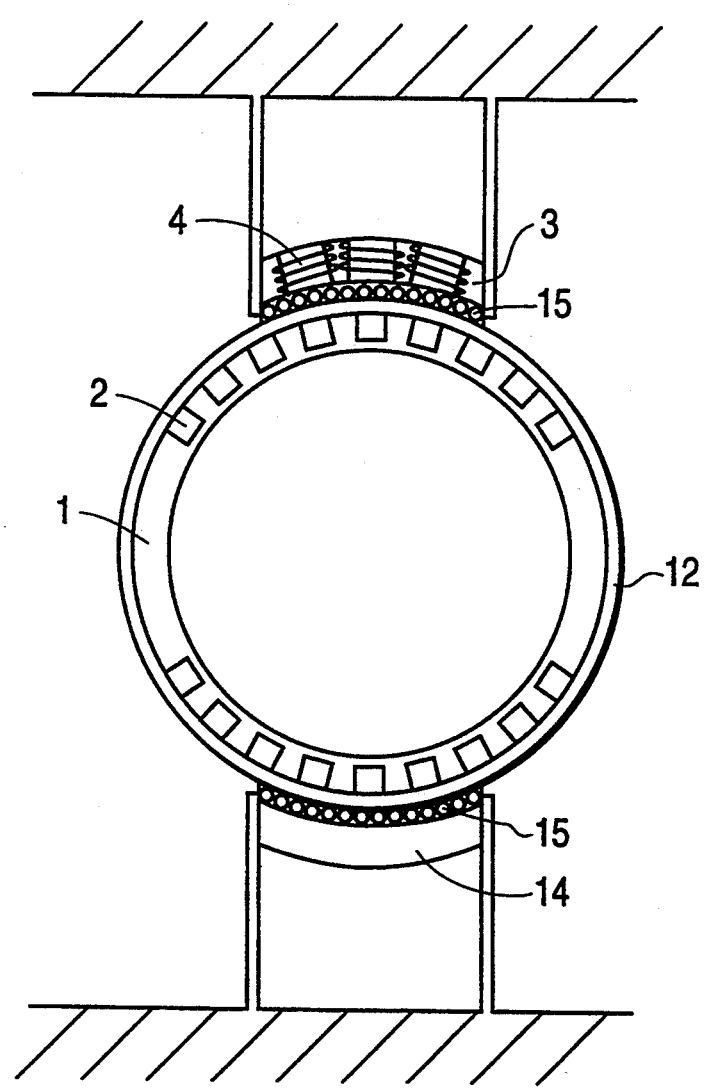
FIG. 10 is a cross-sectional view of a fifth preferred embodiment of an electric motor having a roller bearing according to the present invention.

A fifth preferred embodiment of the present invention is illustrated in FIG. 10. Instead of the hydrostatic bearing 5 of the first preferred embodiment, the embodiment of FIG. 10 employs a roller bearing.

In the above-described embodiment, the spherical rotor 1 is held by rollers interposed between the spherical rotor 1 and the stator 3 and between a spherical bearing 14, disposed at a position symmetrical to the stator 3 with respect to the center of the spherical rotor 1, and the rotor 1.

If the material of the rollers is magnetic material, a magnetic resistance is reduced, whereby the driving force can be generated efficiently.

It is to be noted that although permanent magnets are provided in the spherical rotor 1 and electromagnets 4 are disposed on the stator 3 in every one of the above-described first to fifth preferred embodiments, it is also possible to disposed electromagnets 4 on the spherical rotor 1 and to dispose permanent magnets 2 on the stator 3. Since the substitution of permanent magnets 2 for electromagnets 4 and vice versa is self-evident to those skilled in the art, a further detailed explanation thereof will be omitted.

As described above, the preferred embodiments of the multi-freedom electric motor according to the present invention has a simple structure, can be compact, can be hardly damaged, has a wide operation range, and moreover has a broad space reserved within the rotor for accommodating articles.

The multi-freedom electric motor according to the present invention thus has a broad range of applications, and as one of such applications it can be used as a drive of an agitator as will be described in the following.

Figure 11:
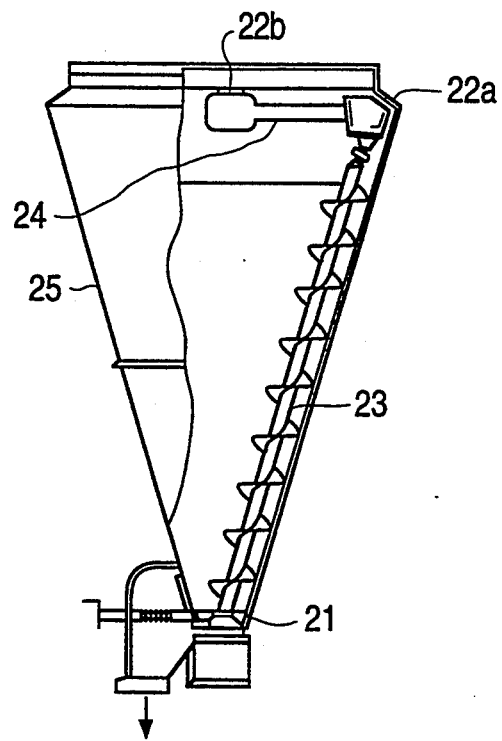
FIG. 11 is a side view, partly cut away, of one example of a mixer using the electric motor according to the present invention as a drive source.

FIG. 11 shows one example of a mixer making use of a three degree of freedom motor according to the present invention. In this figure, reference numeral 21 designates the multi-freedom motor provided at the bottom of the inside of a container 25 having an inverted conical shape. Numeral 23 designates an agitating screw having its bottom end connected to the multi-freedom motor 21 and its top end connected to a bearing 22a. One end of an arm 24 is connected to the bearing 22a, and the other end thereof is connected to another bearing 22b provided at the top of the inside of the container 25.

In the multi-freedom motor 21, an operational drive command signal is used to generate electromagnetic forces at respective electromagnets of the stator, these forces act upon the magnetisms of permanent magnets of the spherical rotor, and the spherical rotor is driven in directions dictated by the operational direction command signal and rotates.

The operational direction command signal includes a command which will cause the spherical rotor of the motor 21 to make the agitating screw 23 to rotate about its own axis, and a command which will cause the rotor to make the agitating screw 23 revolve along the side wall of the container 25.

By employing the multi-freedom motor of the present invention, a ratio of a spinning speed to a revolving speed of the screw can be selected and adjusted depending upon the material to be agitated, whereby the material to be agitated can be optimally mixed.

Next, another application of the present invention to a space stabilizer will be described with reference to FIGS. 12 and 13. In this connection, the space stabilizer is used for maintaining a guidance detector (a visual sensor of a robot, an infrared-ray camera or the like) or an electromagnetic wave transmitter in a spatially stable attitude despite movement, such as rocking or rotation, of an airframe of an aircraft or flying object.

Heretofore, a gimbal mechanism that is independently rotatable about three axes orthogonal to one another was employed as such a stabilizer. Accordingly, the space stabilizer in the prior art has necessitated a complicated mechanical structure, occupies a necessarily large amount of space, and has a limited operation range (swing angle). Moreover, because of dimensional restrictions on the motor for driving the gimbal mechanism, a high output motor could not be employed.

Figure 12:
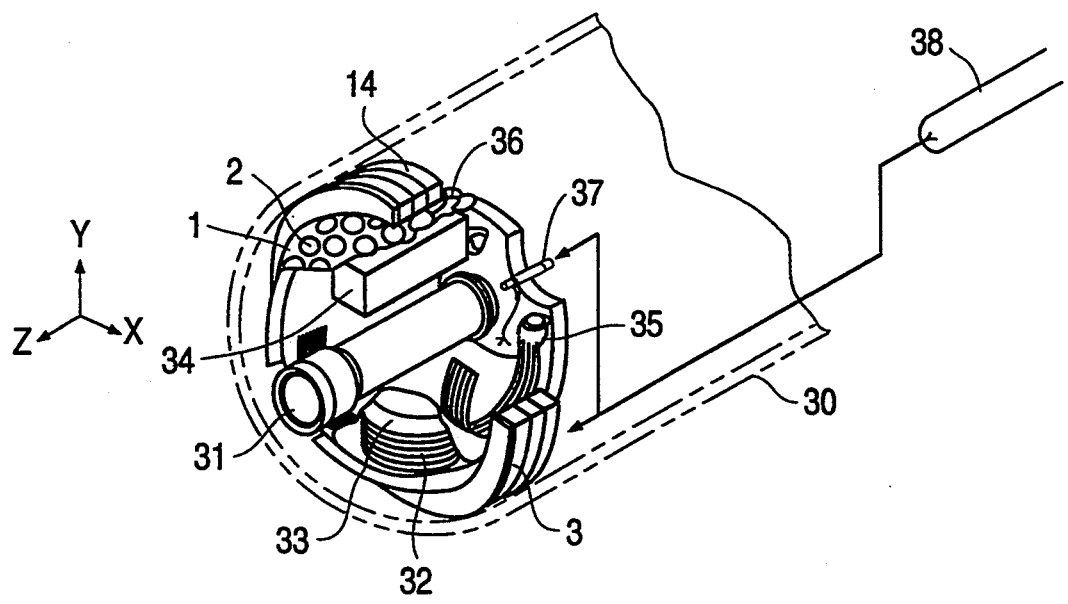
FIG. 12 is a perspective view of a space stabilizer using an electric motor according to the present invention.

In FIG. 12, an annular hydrostatic bearing 14 is provided at and coaxially to a head portion of a flying object 30. Within the same bearing 14 is disposed a spherical rotor 1 consisting of a spherical shell having a plurality of permanent magnets 2 thereon so as to be able to freely perform multi-freedom rotation without friction with a predetermined clearance maintained therebetween owing to a hydrostatic pressure. Also, a stator 3 having a plurality of electromagnets is provided as opposed to the spherical rotor 1.

The spherical rotor 1 is similar to that of the first preferred embodiment of FIGS. 2 to 4, and the stator 3 is similar to that of the first preferred embodiment of FIGS. 5 to 7.

Within the spherical rotor 1 is disposed an infrared-ray camera 31 extending along the Z-axis through the center of the rotor 1. Also, within the spherical rotor 1 are provided optical fiber gyros 32 for the X-axis, Y-axis and Z-axis, respectively.

In FIG. 12, reference numeral 33 designates a gyro controller provided within the spherical rotor 1, numeral 34 designates a video signal processor, and numeral 35 designates an accumulator. In addition, reference numeral 36 designates a hydrostatic bearing seal, numeral 37 designates a coolant piping for cooling the infrared-ray camera 31, and numeral 38 designates a pressurized air bomb connected to the hydrostatic spherical bearing 14 and the coolant piping 37.

Figure 13:
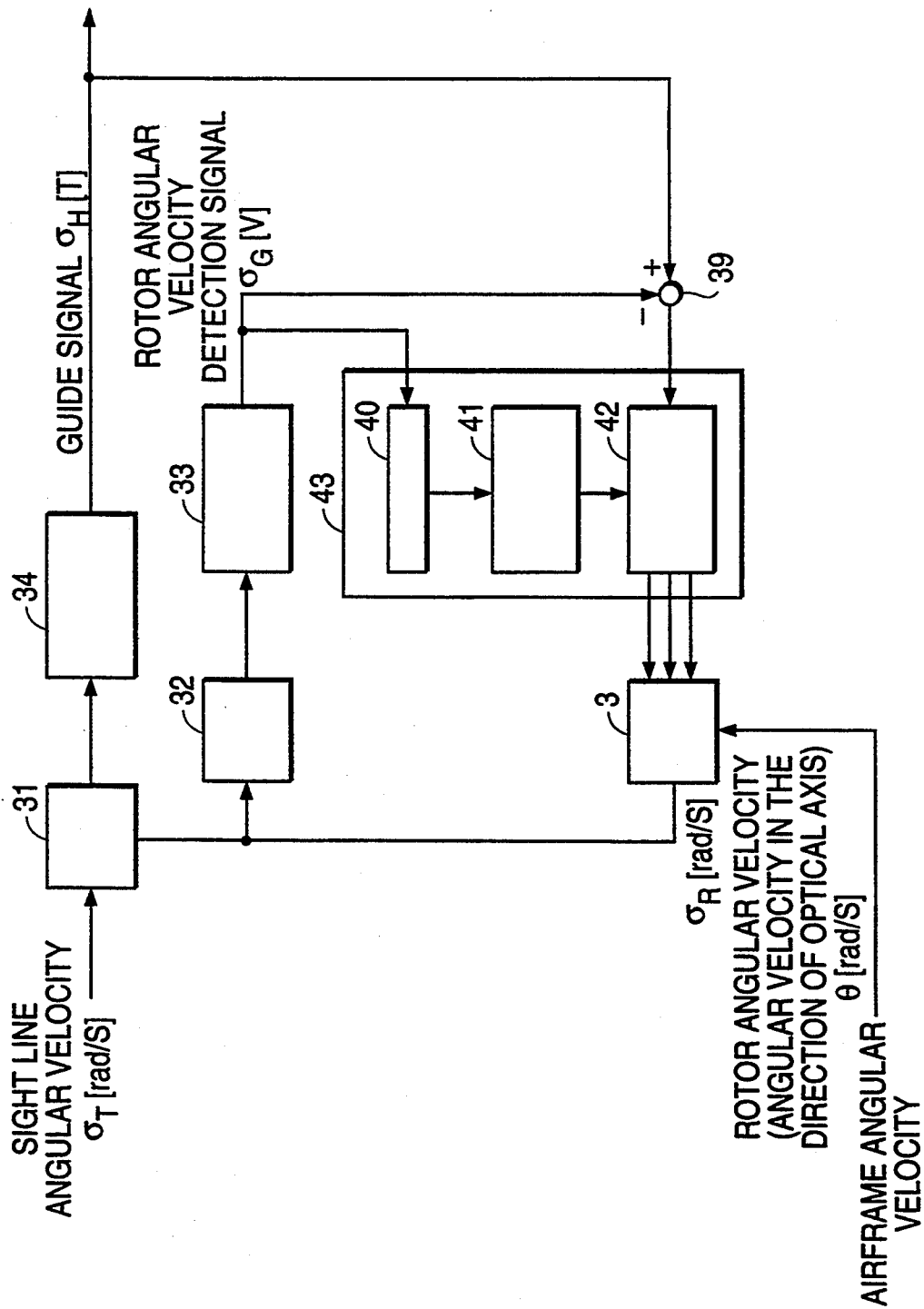
FIG. 13 is a functional block diagram of a controller of the space stabilizer.

A functional block diagram for the above-mentioned apparatus is shown in FIG. 13. An output of the infrared-ray camera 31 is sent via the video signal processor 34 to an addition input of an adder 39. Also, an output of the optical fiber gyro 32 is sent via the gyro controller 32 to a subtraction input of the adder 39. Furthermore, an output of the gyro controller 32 is sent to a control-calculator 42 via an integrator 40 and a rotor/stator relative position calculator 41, sequentially. An output of the adder 39 is set to the control-calculator 42. Further, an output of the control-calculator 42 is sent to the stator 3. The integrator 40, the rotor/stator relative position calculator 41 and the control-calculator 42 jointly form a controller 43.

Pressurized air supplied from the pressurized air bomb 38 causes the spherical rotor to float on the hydrostatic spherical bearing 14 as spaced at a predetermined interval therefrom so as to enable multi-freedom rotation of the rotor.

A signal detected by the optical fiber gyro 32 is converted into a rotor angular velocity signal via the gyro controller 33, and the latter is sent to the adder 39 and the controller 43. This angular velocity signal is integrated in the integrator 40 and becomes a rotor position signal. This rotor position signal is processed in the rotor/stator relative position calculator 41 to be converted into a relative position signal which is sent to the control calculator 42. In addition, an error signal of the guide signal minus the rotor angular velocity signal sent from the adder 39 is transmitted to the control calculator 42. The control calculator 42 transmits positional operation signals to the respective coils of the stator 3 so as to direct the infrared-ray camera 31 of the spherical rotor 1 to a predetermined direction on the basis of these signals. The respective coils are energized by the input signals, thereby rotate the spherical rotor 1, and maintain the orientation of the infrared-ray camera 31 in the predetermined direction within the flying object 30.

Since the spherical rotor 1 can perform multi-freedom rotation, the operational range is broad, and a high precision can be obtained. Moreover, the prior art employs gimbal mechanisms of a plurality of motors and controllers. In the present invention, such complicated mechanisms are unnecessary. Further, because optical fiber gyros and other components are contained within the rotor, and the spherical rotor and the stator are integrated, the present invention is very simple and economical to manufacture. In addition, since the spherical rotor is supported by a spherical bearing, in principle there is no limitation to the operation range thereof. Furthermore, because the outer diameter of the rotor can be large as compared to that of the overall motor, a large torque can be generated, whereby space stabilizing capability is enhanced.

While an infrared-ray camera 31 has been disclosed above as a detector, it is a matter of course that the infrared-ray camera 31 can be replaced by a passive electromagnetic wave radar device, a passive sonar device or the like. In these cases, an electromagnetic wave detector or a sound wave detector having similar effects and advantages to this preferred embodiment can be provided. It is also self-evident that if the camera is replaced by ports of an active electromagnetic wave radar device, a laser transmitter, a CCD, an active sonar device, a fire extinguisher and a sand blaster, then an emitter having similar effects and advantages to this preferred embodiment can be provided. As described above, by loading a detector or a transmitter of electromagnetic waves, light, sound waves or the like on the illustrated space stabilizer, a detector having a broad operation range, a good space stability and a larger output for the same space, can be provided.

Further, a magnetic bearing making use of electromagnets (FIG. 8), a spherical bearing in which a surface pressure is kept constant by a thin film of resin between the rotor and stator (FIG. 9), or a spherical bearing in which rollers disposed between the rotor and stator (FIG. 10), could be employed. However, a hydrostatic bearing in which fluid is blown onto a rotor should preferably be used.

In this preferred embodiment, since an optical fiber gyro is used, the apparatus has a merit in that it is light-weight and has a small inertia. Also, because of a small number of movable mechanical parts it has a long life and is maintenance free. However, various other kinds of gyros could be used depending upon the intended use.

Next, as another application of the present invention, a control moment gyro (hereinafter abbreviated as CMG) making use of an electric motor having a spherical rotor according to the present invention will be described.

Figure 17:
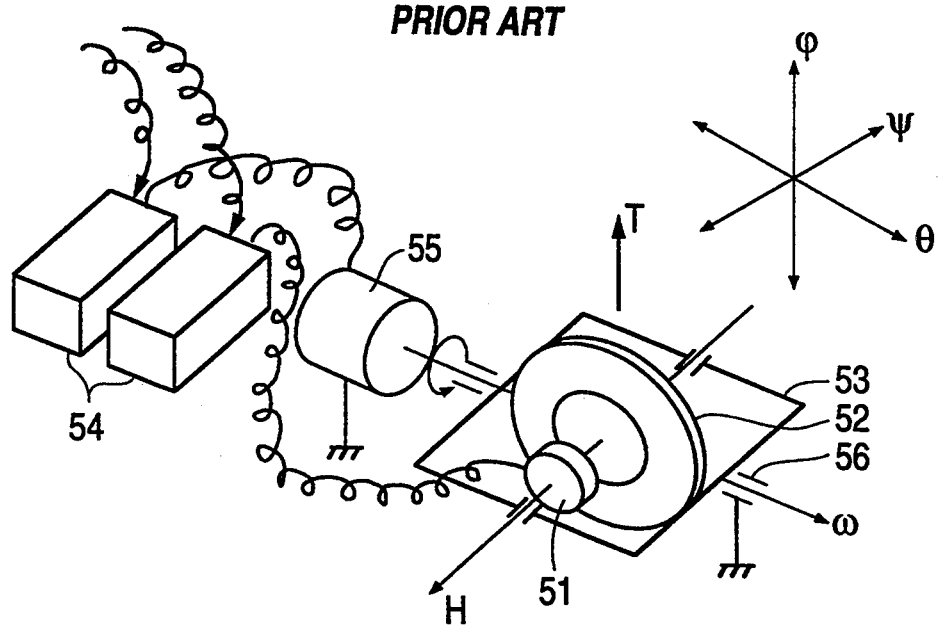
FIG. 17 is a schematic view of a control moment gyro in the prior art.

In a heretofore known CMG, as shown in FIG. 17, a flywheel 52 rotating at a high speed about a $\psi$-axis, as driven by a spin motor 51 connected to a controller 54, is supported by means of a gimbal 53. This gimbal 53 is rotated about a $\frac{1}{4}$-axis by means of a gimbal driving motor 55 connected to the controller 54. Thus, a torque about a $\phi$-axis is obtained as a result of a gyro effect. A plurality of such apparatuses was used to carry out attitude control in space.

The operation of the above-described CMG in the prior art is as follows:

The flywheel 52 is rotated about the $\psi$-axis at a constant speed by means of the spin motor 51, whereby an angular momentum H about the $\psi$-axis is generated. Furthermore, the gimbal 53 is rotated about the $\phi$-axis at a given velocity, whereby an angular velocity vector $\omega$ about the $\phi$-axis is generated. As a result, a torque of $T = H \times \omega$ is generated about the $\phi$-axis by a gyro effect. Hence, the above-described CMG carries out attitude control in an arbitrary space by making use of this torque. It is to be noted that the controller 54 is provided for the purpose of controlling the rotations of the spin motor 51 and the gimbal driving motor 55 on the basis of external instructions, and reference numeral 56 designates a bearing which supports a rotary shaft of the flywheel 52 or the gimbal 53.

In the heretofore known CMG, due to the fact that the spin motor for rotating the flywheel and the motor for driving the gimbal were constructed as separate constituent parts, the structure was complicated and controllers corresponding to the two motors were necessary. Therefore, miniaturization of the CMG was limited. The present invention resolves this problem.

Figure 14:
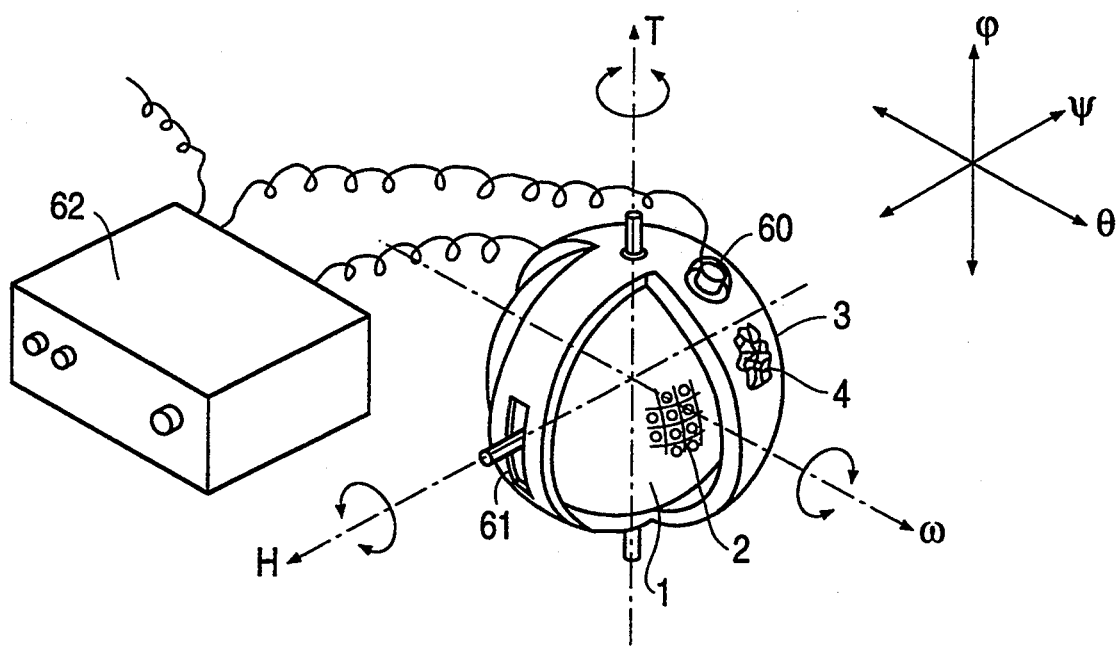
FIG. 14 is a schematic view of a control moment gyro using an electric motor according to the present invention.

In FIG. 14, reference numeral 1 designates a spherical rotor which also serves as a flywheel. This spherical rotor 1 basically has a similar structure to that described previously with reference to FIGS. 2 and 3. Reference numeral 3 designates a stator provided outside of the spherical rotor 1, and this also serves as a gimbal. The structure of this stator 3 is basically similar to that of the first preferred embodiment of FIGS. 4 and 5.

In addition, the spherical stator 3 is equipped with a combined position detector and angular velocity detector 60 for detecting a position ($\psi$ and $\theta$ positions) of the spherical rotor 1. Reference numeral 61 designates a rotary guide for limiting the direction of rotation of the spherical rotor 1 to about the $\psi$-axis and about the $\theta$-axis, and this is fixed to the combined spherical stator and gimbal 3.

Reference numeral 62 designates a controller which controls the electric currents supplied to the electromagnets 4 on the basis of external or internal command signals and a feedback signal sent from the combined position detector and angular velocity detector 60 so that the spherical rotor 1 assumes a predetermined position and velocity. In addition, in the clearance between the spherical rotor 1 and the spherical stator 3 is formed a hydrostatic bearing to permit relative rotation of the spherical rotor 1.

While the external and internal command signals are being input to the controller 62 and the position ($\psi$-position and $\theta$-position) signal of the spherical rotor 1 is being input from the combined position detector and angular velocity detector 60 to the controller 62, the controller 62 supplies electric currents to the respective electromagnets 4 of the spherical stator 3 to generate electromagnetic forces.

The electromagnetic forces generated by the respective electromagnets 4 act upon magnetic pole elements 2 of the spherical rotor 1 and cause the spherical rotor 1 serving as a flywheel to rotate at a constant velocity about the $\psi$-axis, whereby an angular momentum H about the $\psi$-axis is generated, and also cause the spherical rotor 1 to rotate at a given velocity about the $\theta$-axis to generate an angular velocity vector $\omega$ about the $\theta$-axis.

As a result, a gyro-effect generates a torque of $T=H\times\omega$ about the $\Phi$-axis, and the control moment gyro according to this preferred embodiment performs attitude control by making use of this torque.

The CMG according to the above-described preferred embodiment can be compact, highly reliable and has a simple structure due to the fact that a plurality of electromagnets are disposed on the inner surface of the spherical stator and electric currents are supplied from a controller to the electromagnets so that electromagnetic forces generated by these electromagnets act upon a plurality of magnetic pole elements provided on the outer surface of the spherical rotor to apply a torque to the spherical rotor.

Figure 15A:
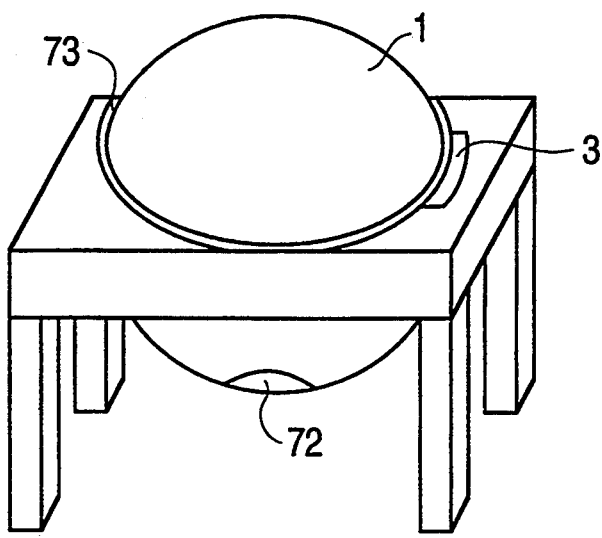
FIG. 15 illustrates a three-dimensional agitator using an electric motor according to the present invention, FIG. 15(a) being a perspective view, and FIG. 15(b) being a vertical sectional view.
Figure 15B:
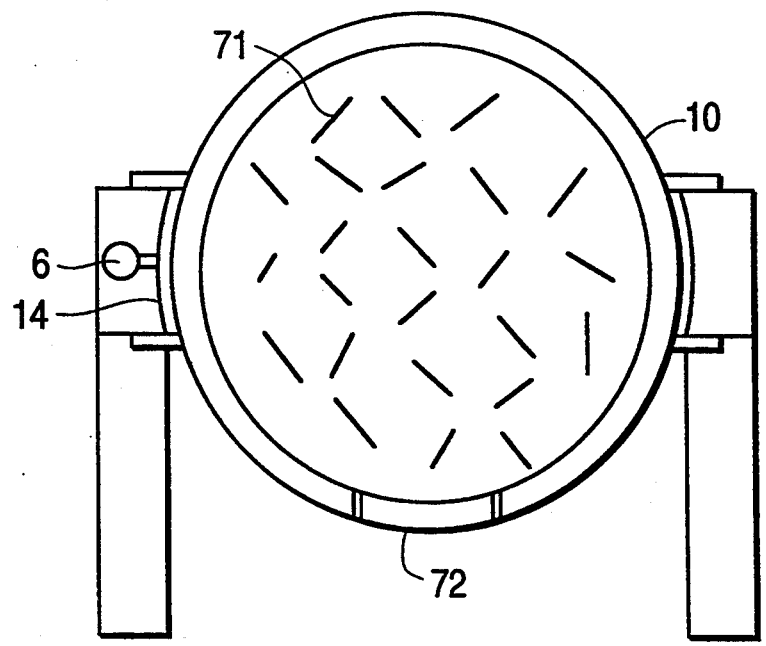
Figure 16A:
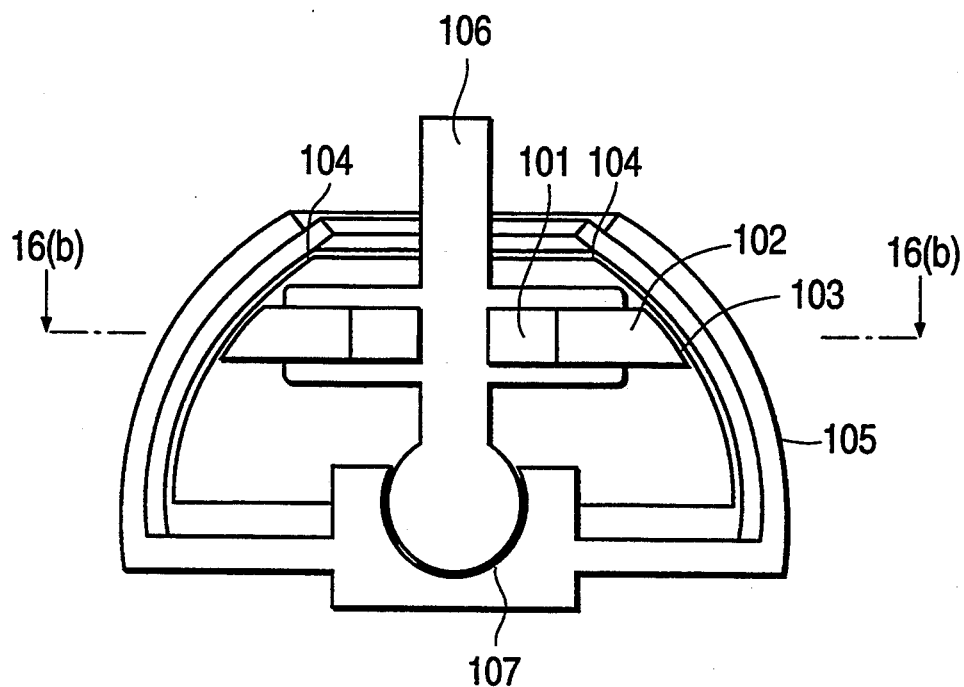
FIG. 16 illustrates a prior art spherical motor, FIG. 16(a) being a vertical sectional view, and FIG. 16(b) being a cross-sectional view taken along line 16b—16b.
Figure 16B:
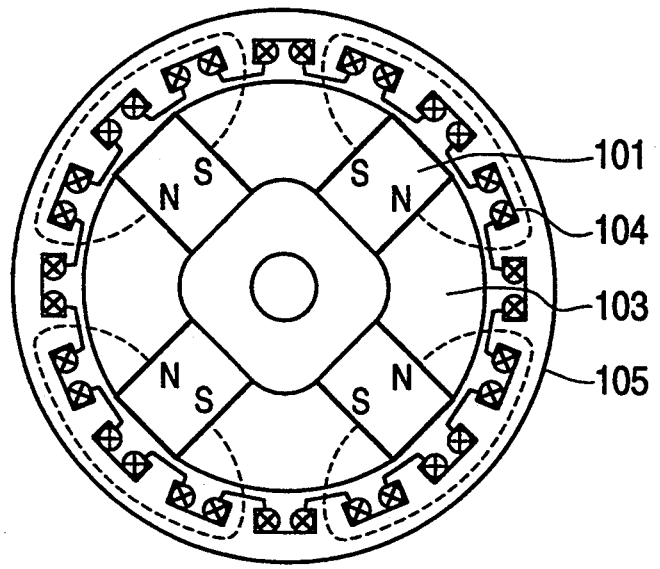

A three-dimensional agitator making use of the multi-freedom electric motor according to the present invention will be described with reference to FIGS. 15(a) and 15(b). Reference numeral 1 designates a hollow spherical rotor similar to the rotor of the first preferred embodiment of the multi-freedom motor. Onto the inner surface of this spherical rotor 1 are mounted blades or scrapers suited to the purpose of the agitator. In the illustrated embodiment, blades 71 are mounted to the spherical inner surface of the spherical rotor 1. Reference numeral 3 designates a stator disposed outside of the spherical rotor 1 and having a plurality of electromagnets (not shown) disposed on its inner surface. The electromagnets are connected to a controller (not shown). Reference numeral 14 designates a spherical hydrostatic bearing provided on the inner surface of the stator 3. This hydrostatic bearing 14 is pressurized by gas supplied from a pressurized gas bomb 6 to hold the spherical rotor 1 in a non-contact manner. Reference numeral 72 designates an intake/exhaust port, and numeral 73 designates a seal member.

Because the spherical rotor 1 is freely rotatable in any direction similarly to the case of the first preferred embodiment, by charging material to be agitated into the spherical rotor 1 through the intake/exhaust port 72 and rotating the spherical rotor 1 in three-dimensions on the basis of an operation direction command signal sent from the controller, material can be agitated in an even manner.

This preferred embodiment is characteristic in that an input shaft is unnecessary, and in that a large output can be obtained because of a large rotor radius. Thus, it is well suited to agitate material having a high viscosity.

While a principle of the present invention has been described above in connection with a number of preferred embodiments, it is a matter of course that many apparently widely different embodiments can be made without departing form the spirit of the present invention.

What is claimed is:

1. A multi-freedom electric motor comprising: a rotor consisting of a shell, said shell having a spherical outer surface and a hollow interior; a plurality of permanent magnets arrayed along a series of intersecting lines and embedded in the shell at the outer surface thereof, and all adjacent magnetic poles of all of said permanent magnets having polarities opposite to one another; a support having a spherical surface confronting the spherical surface of said rotor which allows the rotor to rotate freely in any direction of rotation relative to the support, said support including a stator extending along the outer surface of said rotor, said stator having an inner surface confronting said rotor; a plurality of electromagnets disposed on said inner surface of said stator opposite said permanent magnets; and a controller connected to said electromagnets.

2. A multi-freedom electric motor as claimed in claim 1, wherein said support includes a spherical bearing coupled to said stator.

3. A multi-freedom electric motor as claimed in claim 2, wherein said bearing is a hydrostatic bearing.

4. A multi-freedom electric motor as claimed in claim 2, wherein said bearing is a roller bearing.

5. A space stabilizer for maintaining an attitude of an article regardless of a change in attitude of an apparatus to which the article is mounted, said stabilizer comprising: a rotor consisting of a shell, said shell having a spherical outer surface and a hollow interior; a plurality of permanent magnets arrayed along a series of intersecting lines and embedded in the shell at the outer surface thereof, and all adjacent magnetic poles of all of said permanent magnets having polarities opposite to one another; a support having a spherical surface confronting the spherical surface of said rotor which allows the rotor to rotate freely in any direction of rotation relative to the support, said support including a stator extending along the outer surface of said rotor, said stator having an inner surface confronting said rotor; a plurality of electromagnets disposed on said inner surface of said stator opposite said permanent magnets; a gyro disposed in the hollow interior of said shell; and control means responsive to a signal issued from said gyro for transmitting an operation signal to said electromagnet which will maintain said rotor at a predetermined orientation relative to said stator.

6. A space stabilizer as claimed in claim 5, wherein said support includes a spherical bearing coupled to said stator.

7. A space stabilizer as claimed in claim 6, wherein said bearing is a hydrostatic bearing.

8. A space stabilizer as claimed in claim 7, and further comprising a detector which detects one of electromagnetic waves, light, and soundwaves, said detector being disposed in the hollow interior of said rotor.

9. A space stabilizer as claimed in claim 7, and further comprising an emitter which emits one of electromagnetic waves, light and soundwaves, said emitter being disposed in the hollow interior of said rotor.

10. A space stabilizer as claimed in claim 5, and further comprising a detector which detects one of electromagnetic waves, light, and soundwaves, said detector being disposed in the hollow interior of said rotor.

11. A space stabilizer as claimed in claim 5, and further comprising an emitter which emits one of electromagnetic waves, light and soundwaves, said emitter being disposed in the hollow interior of said rotor.

* * * * *